Patented Nov. 1, 1932                                                              1,886,023

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

CATALYTIC OXIDATION OF ANTHRACENE

No Drawing. Original application filed August 26, 1927, Serial No. 215,759. Divided and this application filed March 29, 1928. Serial No. 265,818.

This invention relates to the catalytic oxidation of anthracene to anthraquinone in the vapor phase.

According to the present invention anthracene is oxidized to anthraquinone in the vapor phase by means of air or other oxidizing gas in the presence of a new class of catalysts or contact masses, namely, those containing zeolites which are the reaction products of at least three classes of components, that is to say, soluble silicates, with at least one metallate and at least one metal salt. These zeolites will be referred to throughout the specification and claims as multi-component zeolites. Some of these new catalysts and contact masses have been described and claimed as products in my co-pending application Serial No. 142,783, filed October 19, 1926, which matured into Patent No. 1,728,732, dated September 17, 1929, of which the present application is in part a continuation. The catalytic oxidation of organic compounds, generally by means of catalysts or contact masses containing multi-component zeolites, has been described and claimed broadly in my co-pending application Serial No. 215,759, filed August 26, 1927, which matured into Patent No. 1,722,297, dated July 30, 1929, of which the present application is a division.

Zeolite forming components may be divided into three classes:—silicates with or without partial substitution of other suitable acidic oxides; metallates, such as alkali metal metallates; and salts of metals which are sufficiently amphoteric to form base exchange bodies when caused to react with silicates under conditions suitable for the production of zeolites. The ordinary zeolites of commerce are prepared by the reaction of a soluble silicate, either with alkali metal metallates or with metal salts. The catalysts of the present invention, on the other hand, are reaction products of a silicate with at least one metallate and at least one salt, the basic radical of which is a metal capable of entering into the non-exchangeable nucleus of a zeolite. The present invention is directed to processes of oxidizing naphthalene in the presence of such multi-component zeolites and their derivatives, in which at least one catalytically active element or radical is chemically combined with or in the zeolite. Both diluted and undiluted multi-component zeolite catalysts can be used in the present invention, but in many cases the use of diluted multi-component zeolites is preferable. In the diluted zeolite contact masses used in the present invention, the catalytic power may reside wholly in the zeolite or in chemical combination therewith, or it may reside partly in the zeolite and partly in diluents combined therewith to form mixtures or preferably physically homogeneous structures. In some cases diluents may be associated with catalytically ineffective multi-component zeolites, and such processes are included within the scope of the present invention.

All of the base exchange bodies used in the present invention, both diluted and undiluted, possess a remarkably porous, honeycomb-like structure, and are in many cases opalescent. When suitable catalytically active components are present, they form catalysts or contact masses of remarkable efficiency, due probably in part at least to the extraordinarily high surface energy of the microscopically porous structures, and probably also to the presence of unsaturated valences in many cases and a symmetry of the molecules. It is of course possible that the catalytic activity of the contact masses used in the present invention is due partly or wholly also to other reasons, and the present invention is therefore not intended in any sense to be limited to any theory of action of the products. The molecular complexes which are present in the products used in the present invention are apparently of great size and complexity, and the exact chemical constitution has not been determined, nor has it been determined definitely whether in all cases single chemical compounds are formed, and it is possible that in some cases at least molecular mixtures or solid solutions may be present. The products used possess a physically microscopical homogeneity, and behave in many ways as if they were single compounds, or in the case of diluted zeolites, the zeolite skeleton behaves as if it were a single compound, and I am of the opinion that probably in many cases at least the zeolites are actually in fact single compounds of high molecular weight.

It should be understood that the products used in the present invention are chemically quite distinct from zeolites formed by the reaction of a silicate with either metallates or with metal salts, the so-called two-component zeolites.

The products used in the present invention fall into three main types, depending on the relative proportions of the three classes of components:—If the silicate and metallate components predominate over the metal salt components the resulting products resemble the alumino-silicate type of zeolites if the metal salt and silicate components predominate over the metallate component the resulting products have certain resemblances to the aluminum-double silicate type of zeolites where the metallate and metal salt components predominate over the silicate components the products resemble the non-silicious base exchange bodies described in my Patent No. 1,694,620 dated December 11, 1928. It should be understood of course that there are no sharp lines dividing the different types, and one type shades over into the other, as the relative proportions of the components are varied. I have found that all three types of zeolites when prepared with suitable catalytically active components, or associated with suitable catalytically active diluents, and particularly when containing elements of the 5th and 6th groups of the periodic system especially vanadium, form very effective catalysts for the oxidation of naphthalene.

The fact that the zeolites used in the present invention are the reaction products of silicates with both metallates and metal salts makes it readily possible to introduce catalytically active components of the most varying types, and the introduction of catalytically active components of different types is readily facilitated, since some catalytically active elements or some valences of such elements form metal salts but do not form metallates, or vice versa. All such catalytically active components can of course be readily introduced into zeolites used in the present invention, and this constitutes an important advantage. Another important advantage of the invention lies in the fact that apparently owing to the great molecular weight of the zeolites used the proportions of the components entering into the zeolite can be varied practically at will, and exact combining proportions of the various elements are not encountered as in the case of simple chemical compounds of relatively lower molecular weight.

The zeolites of the present invention can be prepared under reaction conditions suitable for the formation of base exchange bodies; that is to say, in reaction mixtures which are finally alkaline to litmus. The best base exchanging power is obtained when the products are prepared in solutions which are neutral or preferably alkaline to phenolphthalein, but products of lower base exchanging powers which for the catalytic oxidation of anthracene are frequently of equal efficiency can be produced under reaction conditions ranging from phenolphthalein red to litmus blue as indicator turning points. It is not possible to determine whether zeolites formed under such conditions are homogeneous chemical compounds; it may be that in such cases a mixture of zeolites and non-base exchanging polysilicates are produced. The physical structure, however, remains similar and for catalytic purposes the products are equivalent to zeolites produced under conditions which result in greater base exchanging powers. It should be understood, however, that the word "zeolite" as used in the present application is limited to polysilicates which have at least some base exchanging power when freshly prepared.

Products used in the present invention may be prepared in many ways:—I have found that usually it is desirable to add the metal salt to the metallate and silicate so that at all times the alkali of the latter components is present in excess, and accordingly the reaction automatically at all times remains alkaline to litmus. While, however, this preferred method presents numerous advantages in most cases and results in the production of excellent products with a minimum of supervision, other methods of reaction can be used, and are included in the invention.

Certain of the catalysts used in the present invention may be prepared by adding the silicate or metallate components, or both, to the metal salt components, care being taken that after the reaction is completed the reaction mixture is alkaline to litmus, and preferably neutral or alkaline to phenolphthalein. It is probable that during the reaction at first ordinary silicates are formed, which are later transformed more or less completely into base exchanging bodies. The base exchanging power of such products is lower than that of products which are prepared by adding the metal salt components to the other two components, so that the reaction continuously remains alkaline, but many effective catalysts can be produced by the other method, and are therefore included in the scope of the present invention.

The number of elements which may be included in the products used in the present invention is very large. Thus for example, any of the metal elements which are capable of forming soluble alkali-metal metallates may be used, and similarly complex compounds of metals, which metals possess a more or less amphoteric property may be used, and for some purposes are of great importance, as they permit the production of soluble metallate components, whereas the simple oxides of the metals may not be suitable, because they do not form soluble alkalimetal metallates. A few among the complex ionogens may be mentioned:—ammonia, hydrocyanic acid, sulfocyanic acid, oxalic acid, formic acid, tartaric acid, citric acid, glycerine and various types of sugars.

Certain compounds such as for example, vanadates, molybdates, tungstates, tantalates and uranates, which are not ordinarily considered as metallates, but which are capable of forming base exchange bodies with soluble silicates and metal salts, are intended to be included under the term "metallates" as used in the present invention. I therefore include under this term any alkali-metal compound of a metal acid which is capable of forming with soluble silicates and metal salts base exchange bodies, or which can be rendered capable of so reacting by a change of valance which can be effected during the reaction. Thus for example, certain alkali permanganates which are incapable of forming base exchange bodies containing heptavalent manganese may be caused to react with soluble silicates and metal salts in the presence of suitable reducing agents which reduce the permanganate to a stage of oxidation in which it is capable of behaving as a metallate. Such compounds are included under the classification of metallates for the purposes of the present invention, and some very valuable products can be produced by the use of this type of compound. An example of an important element which may be so used is tetravalent vanadium.

The present invention may utilize a single metallate component, or a plurality of metallate components in any desired ratio may be used. The following elements are included among those forming metallates which can be used:—aluminum, chromium, zinc, vanadium, beryllium, tin, palladium, osmium, platinum, titanium, zirconium, lead, tungsten, boron, molybdenum, uranium and tantalum, copper, nickel, iron, cobalt, silver, cadmium, manganese, bismuth, thorium, and cerium.

The metal salt components are likewise numerous, and in general, any water-soluble, acid, neutral or basic salts or any mixtures may be used. The following elements are included among those which form suitable salts:—copper, silver, gold, beryllium, zinc, cadmium, aluminum, rare earths, titanium, zirconium, tin, lead, thorium, chromium, uranium, vanadium, manganese, iron, nickel and cobalt.

The silicate component may be an alkali-metal silicate or other silicate which is soluble in alkali or part of the silicate component may be substituted in part by alkaline salts of the acids of the following elements:— boron, phosphorus, sulfur, nitrogen, tin, tellurium, selenium, arsenic and antimony. All of these compounds are capable of forming base exchange bodies with the other components, and are therefore to be considered the equivalent of the silicates.

The range of the new products used in the present invention is not limited to the elements present in the components which particularly form the non-exchangeable nucleus of the zeolite. On the contrary, it is possible to substitute the alkali-metal ions by other metal cations by means of base exchange. Thus for example, one or more of the following cations may be introduced:—ammonium, copper, silver, gold, beryllium, magnesium, calcium, zinc, strontium, cadmium, barium, aluminum, thallium, titanium, zirconium, tin, thorium, vanadium, chromium, uranium, manganese, iron, cobalt, nickel, palladium, and platinum. The elements or radicals may be introduced as simple or complex ions, or both, in any desired proportions. The introduction can be effected simultaneously or successively. The number of possible combinations by means of base exchange is of course very great, as will be readily apparent to a zeolite chemist. The number of new compounds is therefore greatly increased, and many valuable products, particularly catalysts or activators, can be produced by the introduction of suitable base exchange ions, which may increase the concentration of catalysts or activators in the product, or may result in a more finely tuned catalyst. The increase in catalytic activity which is frequently possible by a suitable introduction of the desired cations by base exchange frequently increases the permissible loading of the product in anthracene oxidations and may increase resistance to high temperatures, the percentage yield which can be obtained thereby, or the output, or both.

A further series of catalysts can be obtained by treating the base exchange bodies of the present invention with compounds containing suitable acid radicals which form with the base exchange bodies salt-like bodies. While these products behave in many ways as if they were actual salts, the exact chemical constitution of the products is not definitely known, and the invention is not intended to be limited by any theory as to compositions.

For the purposes of the present invention, acids or salts of the following elements may be used in order to produce salt-like bodies:— vanadium, tungsten, uranium, chromium, molybdenum, manganese, selenium, tellurium, arsenic, phosphorous, sulfur, chlorine, bromine fluorene nitrogen and boron. Simple acids or their salts can be utilized, or polyacids, peracids and complex ions may be substituted wherever this is desirable. Other complex anions, such as ferro or ferricyanogen, sulfocyanogen, other metal cyanogens, ammonia complexes and the like are useful wherever they form salt-like bodies with the base exchange bodies with which they are to react. One or more acid radicals may be introduced in the above described manner, either simultaneously or successively, and the amount of acid radicals introduced can be quantitatively varied so that by this means salt-like base exchange bodies having the characteristics of acid neutral or basic acid derivatives can be produced.

The diluted zeolites which I have found to be the most effective catalysts or contact masses for the oxidation of anthracene can be prepared in a number of ways by the incorporation of a large variety of diluents, such as for example, highly porous diluents, as kieselguhr, glaucosil, "celite" (the compacted form of kieselguhr mined on the Pacific coast of the United States by the Celite Products Corporation) brick refuse, silicates, inactive zeolites, pumice meal, and other products, or they may be coated onto natural and artificial massive carrier fragments. The method of incorporating, and nature of diluents which are to be used, has been described in detail in the patent of Alphons O. Jaeger and Johann A. Bertsch, No. 1,701,075 dated February 5, 1929, where the incorporation of diluents in two component zeolites is described. While the present products are chemically quite different from zeolites which are prepared from two components, the methods of precipitation are analogous. I have found, therefore, that in most cases the same methods of incorporating diluents which have been described in the prior application, above referred to, in connection with two component zeolites, may be advantageously used for the incorporation of diluents in base exchange bodies used in the present invention. As described in the prior application, the diluents may be incorporated into the physical structure of the base exchange bodies, or the base exchange bodies can be formed in the interstices of relatively coarser diluents. Specific methods of incorporating diluents with base exchange bodies of the present invention will also be described in many of the specific examples which are to follow, it being understood of course that the invention is in no sense limited to the details of the examples which are illustrative modifications only.

The precipitation of the base exchange bodies is frequently slow, and sometimes incomplete, and it is often desirable to accelerate or complete the precipitation by heating, vigorous stirring, or by the addition of acids, either organic or inorganic, in liquid or gaseous form. Thus for example, hydrochloric acid, sulfuric acid, carbonic acid, nitric acid, acetic acid, formic acid and the like, or their acid salts, may be used. Ammonium salts and salts of the alkalis as well as halogens, alcohols and other organic substances, are frequently advantageous in accelerating precipitation, and are included in the scope of the present invention. In some cases, it is advantageous to operate under pressure in autoclaves, and the present invention is therefore not limited in its broader aspects to operations under any particular pressure.

The important property of porosity of base exchange products of the present invention may in many cases be enhanced by the incorporation with the bodies, during formation, of products which are readily removable either by volatilization, combustion or by leaching, leaving behind additional pores, and thus still further contributing to the permeability of the framework of the base exchange products. The removable products to be used may be inorganic or organic, and include a wide number of products, but the choice of products will of course depend on the characteristics of the base exchange body.

The production of base exchange bodies usually results in a considerable percentage of soluble salts in the reaction mixture, and it is generally desirable to wash out these salts and to dry the products preferably at moderate temperatures which may advantageously be below 100° C. Some of the products may contain too little alkali for the purposes for which they are to be used, or they may lack mechanical strength. These products may advantageously be washed or impregnated with a dilute water-glass solution, instead of with water, with a resulting silification which considerably increases the mechanical strength of the product, and may also desirably affect its chemical constitution, particularly by changing its alkalinity or acidity.

I find that it is often advantageous to subject the catalysts and contact masses used in the present invention to a preliminary treatment, consisting, first, in a calcination in the presence of air or other gases as described in my Patents No. 1,678,626 and 1,678,627 dated July 24, 1928.

This preliminary treatment of the catalytic process itself, which takes place at high temperature, results in certain chemical changes in the catalyst or contact mass which are not well defined, and when the catalyst is referred to in the claim, it should be considered as of the time when it is freshly made, as is usual in catalytic chemical nomenclature.

The oxidation of anthracene requires a slowing down, or stabilizing, of the catalysts used, in order to prevent excessive losses through total combustion, or to permit stopping at a definite intermediate oxidation product with maximum yield. I have found that the presence of salts of alkali-forming metals and other non-catalytic components may act as stabilizers, as may the oxides or hydroxides themselves in some cases. Other catalytically active or activating substances which enhance the effectiveness of the stabilizers, and which are termed stabilizer promoters, may also be used. In fact whenever base exchange catalysts of the present invention which contain exchangeable alkali-metal cations are given preliminary treatment with acid vapors, alkali forming metal compounds are produced which act as stabilizers, and many of the amphoteric or other metal components which are not selective catalysts for the oxidation of anthracene may be considered, and act as stabilizer promoters. I do not claim in this application the use of stabilizers or stabilizer promoters in general, as these form the subject-matter of my co-pending application, Serial No. 264,571, filed March 24, 1928. The expressions "stabilizers" and "stabilizer promoters", when used in the present application, are to be understood as used in the sense in which they are defined in the aforementioned co-pending application. It should be understood that while many of the multi-component zeolite catalysts used in the present invention may be considered as composite stabilizers and stabilizer promoters, the invention is not limited thereto, and stabilizers or stabilizer promoters, or both, may be separately added to the catalysts of the present invention, and in fact many of the diluents, for example those containing certain heavy or amphoteric metal compounds are to be considered as stabilizer promoters.

The present invention is not only applicable to the oxidation of relatively pure or high grade anthracene, but may also be used for the oxidation of impure anthracene, for example, anthracene containing carbazole or phenanthrene as impurities. When impure anthracene is oxidized the contact mass preferably should contain stabilizers or stabilizer promoters which favor the total combustion of the impurities. Thus for example strongly alkaline stabilizers, which are relatively poor stabilizers for the oxidation of pure anthracene to anthraquinone, are effective in the selective total combustion of carbazole and similar nitrogenous heterocyclic compounds. When impure anthracene is oxidized the reaction may take place in a single step, or it may take place in two steps, part of the contact mass favoring the selective combustion of impurities and part favoring the oxidation of anthracene to anthraquinone. It is one of the great advantages of the present invention that the range of quality of anthracene which can be used is very great, and relatively low grade anthracene can be effectively handled. It should be understood that when the reaction takes place in a single stage a compromise contact mass must be used as the most effective contact masses for the oxidation of anthracene to anthraquinone are not always the most effective for the selective combustion of impurities. The best compromise will depend on the nature of the crude anthracene used and on the nature of the contact mass chosen.

The invention will be described in greater detail in connection with the following specific examples which are illustrative merely; and do not limit the broader scope of the invention. The examples, however, do in many cases contain specific features which in their more narrow aspects are included in the present invention. The examples give a few typical reaction conditions and catalysts, but it should be understood that the skilled catalytic chemist will choose within the confines of the present invention catalysts and reaction conditions best suited to the particular reaction in which he is interested.

*Example 1*

Three mixtures are prepared as follows:
(1) 210 to 250 parts of potassium or sodium waterglass solution of 33° Bé. diluted with 15 to 20 volumes of water are mixed with kieselguhr or other material rich in $SiO_2$ such as glaucosil, the acid treated residue of greensand, until a suspension is obtained which is just stirrable.
(2) 18 parts of $V_2O_5$ are dissolved in just sufficient 10–20% caustic potash or caustic soda solution so that potassium or sodium vanadate is obtained.
(3) 18 parts of $V_2O_5$ are reduced with sulphur dioxide in aqueous suspension in the usual way to form the blue vanadyl sulfate about 200 to 300 parts of water being needed. The excess $SO_2$ is removed by boiling.

Mixtures (1) and (2) are poured together and solution (3) is permitted to flow in with vigorous agitation, taking care that the reaction mixture remains at least alkaline to litmus. The alkalinity can be adjusted by slight additions of N. potassium hydroxide solution, if necessary. A dirty gray-blue gel results which is filtered with suction, washed with a little water and then dried and constitutes a three component base exchange body containing tetravalent and pentavalent vanadium in nonexchangeable form and having materials rich in $SiO_2$ finely distributed throughout its framework.

After calcination the contact mass is well suited for the catalytic oxidation of crude anthracene directly to high grade anthraquinone when 45 to 50 per cent anthracene is uniformly vaporized with air in the ratio of 1 : 25 and passed over the catalyst at 380 to 450° C.

A still further adjustment of the contact mass for the catalytic oxidation of anthracene can be effected by exchanging part of the exchangeable alkali for other cations such as, for example, copper, silver, iron, cobalt, aluminum, titanium, manganese, cerium and nickel, using 3 to 6% solutions of these salts or their mixtures.

Contact masses which contain iron and manganese or a mixture of both introduced by base exchange are excellently suitable for the catalytic oxidation of anthracene to anthraquinone, acenaphthene to naphthalic anhydride and hemimellitic acid.

A further improvement of these contact masses for several specific catalytic oxidation reactions can be effected by forming salt-like bodies of the three component base exchange body with acids of the elements of the 5th and 6th group of the periodic system, especially vanadium, tungsten, and molybdenum.

A further modified method of preparing highly efficient contact masses consists in introducing in the diluents, before use, vanadates, molybdates, tungstates, chromates or tantalates, especially of the heavy metals. For this purpose the diluents may be impregnated with 3 to 5% of such metallates in the usual way whereby very effective catalysts for the catalytic oxidations of anthracene are obtained.

Example 2

12 parts of $V_2O_5$ are suspended in 300 parts of water to form a slurry, acidified with 3 to 6 parts of concentrated sulphuric acid and then reduced to the blue vanadyl sulphate by well known reducing means as, for example, by means of gases containing $SO_2$ which are passed in the solution at the boiling temperature.

108 parts of waterglass solution of 33° Bé. are diluted with 400 parts of water and about 80 to 100 parts of "celite" brick refuse are stirred in.

The waterglass solution is then poured into the vanadyl sulphate solution with vigorous agitation precipitating out vanadyl silicate diluted with "celite" brick refuse. Care should be taken that after all the solutions have reacted the resutling mixture must by neutral to litmus, which can be adjusted with the help of small amounts of N. sulphuric acid.

150 parts of potassium waterglass solution of 33° Bé. are diluted with 300 parts of water.

6 parts of $V_2O_5$ are transformed with the help of N. KOH solution to potassium metavanadate and the waterglass solution and vanadate solution are mixed together.

40 parts of $Al_2(SO_4)_3$ 18 aq. are dissolved in 250 parts of water.

To this latter solution the ground, diluted vanadyl silicate is added with vigorous agitation in order to bring it in a suspension, then the mixture of the two solutions of waterglass and vanadate are added in a thin stream with vigorous agitation.

The reaction mixture after the addition of the mixed solutions must be neutral or alkaline to phenolphthalein and the desired neutrality or alkalinity can easily be adjusted by using corresponding amounts of N. sulphuric acid with vigorous agitation. The reaction mixture is separated from the mother liquor in the usual way and washed with twice the amount of the mother liquor obtained, dried and broken in suitable pieces.

After calcining, for dehydrating purposes, the contact mass obtained can be used for the catalytic oxidation of 50 to 70% crude anthracene direct to anthraquinone, whereby the impurities such as carbazole and phenanthrene are substantially burned out.

Instead of using a potassium vanadate solution as the metallate component other catalytically active metallates, such as, tungstates and molybdates, may be used.

Instead of using an aluminum sulphate solution as the metal salt component other metal salts, such as those of iron, copper, silver, nickel, cadmium, titanium, zirconium and chromium may be used singly or in admixture, contact masses with specific efficiency for other oxidation reactions being produced.

Example 3

A mixture of 10 parts of $V_2O_5$ and 4 parts of $WO_3$ are dissolved in 300 parts of diluted KOH solution containing about 10.5 parts of 90% KOH. To this solution about 90 parts of "celite" brick refuse or a mixture of comminuted quartz and diatomaceous earth equal in volume to the "celite" brick refuse are added with vigorous agitation. Other diluents, as described in former examples, are also applicable, for example pumice.

The suspension is heated up to 80 or 90° C. and is gradually made faintly acid to Congo, using 2 N. sulphuric acid in order to precipitate out $V_2O_5$ and $WO_3$, in this diluent, or, in the mixture of the diluents. The mixture obtained is then dried and ground.

40 parts of 33° Bé. potassium waterglass solution are weighed out.

2 parts of $Al_2O_3$ are transformed to the corresponding potassium aluminate in the usual way with the help of 5 N. potassium hydroxide solution.

The two solutions are then mixed together and, immediately after mixing, kneaded thoroughly with the $V_2O_5$ and $WO_3$ precipitate and then formed into suitable pieces. These formed pieces are then dried at temperatures under 100° C. preferably with gases containing $CO_2$, whereby a diluted three component base exchange body is obtained containing $V_2O_5$, $WO_3$, $Al_2O_3$ and $SiO_2$ in non-exchangeable form. The contact mass so obtained is calcined with 3 to 6% $SO_2$ gases containing a sufficient amount of oxygen, first at room temperature and then at 450 to 500° C.

Instead of using potassium aluminate other metallates of elements with amphoteric properties can be used, such as, cadmium, beryllium, and zinc.

In many cases it is also advantageous to embed stabilizer promoters such as, 5% $Fe_2O_3$, $TiO_2$ or $MnO_2$ in situ. Contact masses containing iron and manganese as stabilizer promoters are well fitted for the catalytic oxidation of anthracene to anthraquinone using 90% anthracene uniformly vaporized with air in different ratios, e. g. 1:40, are passed over the contact mass at 360 to 380° C. whereby excellent yields of anthraquinone are obtained.

In most of the examples the metal salt solution is added to the metallate solution, and this may be considered as the preferred method for producing non-silicious base exchange bodies used as contact masses in the present invention, but it should be understood that the invention is not limited to the use of contact masses or catalysts produced by this preferred procedure. On the contrary, some valuable contact masses may be produced by the converse procedure, in which the metallate solution is added to the metal salt solution. As in this case the relatively alkaline solution is added to the relatively acid solution it is impossible to maintain continuously an alkaline reaction. Care must of course be taken that in all cases after the reaction is completed the mixture shows alkalinity to litmus, and preferably a neutrality or alkalinity to phenolphthalein.

What is claimed as new is

1. A method of oxidizing anthracene to anthraquinone, which comprises vaporizing anthracene and causing the vapors to react with an oxidizing gas at reaction temperature in the presence of a contact mass containing at least one zeolite which is the reaction product of at least one silicate, at least one metallate and at least one salt, the basic radical of which is a metal capable of entering into the non-exchangeable nucleus of a zeolite.

2. A method of oxidizing anthracene to anthraquinone, which comprises vaporizing anthracene and causing the vapors to react with an oxidizing gas at reaction temperature in the presence of a contact mass containing at least one diluted zeolite which is the reaction product of at least one silicate, at least one metallate and at least one salt, the basic radical of which is a metal capable of entering into the non-exchangeable nucleus of a zeolite.

3. A method of oxidizing anthracene to anthraquinone, which comprises vaporizing anthracene and causing the vapors to react with an oxidizing gas at reaction temperature in the presence of a contact mass containing at least one zeolite which is the reaction product of at least one silicate, at least one metallate and at least one salt, the basic radical of which is a metal capable of entering into the non-exchangeable nucleus of a zeolite, at least one catalytically active component of the contact mass being chemically combined in or with the zeolite.

4. A method of oxidizing anthracene to anthraquinone, which comprises vaporizing anthracene and causing the vapors to react with an oxidizing gas at reaction temperature in the presence of a contact mass containing at least one zeolite which is the reaction product of at least one silicate, at least one metallate and at least one salt, the basic radical of which is a metal capable of entering into the non-exchangeable nucleus of a zeolite, at least one catalytically active component of the contact mass being chemically combined in or with the zeolite in non-exchangeable form.

5. A method of oxidizing anthracene to antraquinone, which comprises vaporizing anthracene and causing the vapors to react with an oxidizing gas at reaction temperature in the presence of a contact mass containing at least one diluted zeolite which is the reaction product of at least one silicate, at least one metallate and at least one salt, the basic radical of which is a metal capable of entering into the non-exchangeable nucleus of a zeolite, at least one catalytically effective component of the contact mass being physically associated with the zeolite in the form of a diluent.

6. A method of oxidizing anthracene to anthraquinone, which comprises vaporizing anthracene and causing the vapors to react with an oxidizing gas at reaction temperature in the presence of a contact mass containing at least one zeolite which is the reaction product of at least one silicate, at least one metallate and at least one salt, the basic radical of which is a metal capable of entering into the non-exchangeable nucleus of a zeolite, the contact mass containing an oxy-compound of vanadium as at least one of its catalytically active components.

7. A method of oxidizing anthracene to anthraquinone, which comprises vaporizing anthracene and causing the vapors to react with an oxidizing gas at reaction temperature in the presence of a contact mass containing at least one zeolite which is the reaction product of at least one silicate, at least one metallate and at least one salt, the basic radical of which is a metal capable of entering into the non-exchangeable nucleus of a zeolite in which chemically combined vanadium is present.

8. A method of oxidizing anthracene to anthraquinone, which comprises vaporizing anthracene and causing the vapors to react with an oxidizing gas at reaction temperature in the presence of a contact mass containing at least one zeolite which is the reaction product of at least one silicate, at least one metallate and at least one salt, the basic radical of which is a metal capable of entering into the non-exchangeable nucleus of a zeolite, the contact mass containing iron as a catalyst included in the group consisting of hydrogenation catalysts, dehydrogenation catalysts, reduction catalysts, oxidation catalysts which, when used alone, are not specific catalyst for the oxidation of anthracene to anthraquinone.

9. A method of oxidizing anthracene to anthraquinone, which comprises vaporizing anthracene and causing the vapors to react with an oxidizing gas at reaction temperature in the presence of a contact mass containing at least one diluted zeolite which is the reaction product of at least one silicate, at least one metallate and at least one salt, the basic radical of which is a metal capable of entering into the non-exchangeable nucleus of a zeolite, at least part of the diluents containing vanadium compounds.

10. A method of oxidizing anthracene to anthraquinone, which comprises vaporizing anthracene and causing the vapors to react with an oxidizing gas at reaction temperature in the presence of a contact mass containing at least one diluted zeolite which is the reaction product of at least one silicate, at least one metallate and at least one salt, the basic radical of which is a metal capable of entering into the non-exchangeable nucleus of a zeolite, at least part of the diluents containing iron vanadate.

11. A method of oxidizing anthracene to anthraquinone, which comprises vaporizing anthracene and causing the vapors to react with an oxidizing gas at reaction temperature in the presence of a contact mass containing at least one diluted zeolite which is the reaction product of at least one silicate, at least one metallate and at least one salt, the basic radical of which is a metal capable of entering into the non-exchangeable nucleus of a zeolite, at least part of the diluents containing oxy-compounds of iron.

Signed at Pittsburgh, Pennsylvania, this 21st day of March, 1928.

ALPHONS O. JAEGER.